United States Patent
Huang et al.

(10) Patent No.: US 10,911,139 B2
(45) Date of Patent: Feb. 2, 2021

(54) METHOD AND APPARATUS FOR DETECTING MPI NOISE PROBLEM

(71) Applicant: HUAWEI TECHNOLOGIES CO., LTD., Shenzhen (CN)

(72) Inventors: Xi Huang, Shenzhen (CN); Guodao Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/674,177

(22) Filed: Nov. 5, 2019

(65) Prior Publication Data
US 2020/0067595 A1    Feb. 27, 2020

Related U.S. Application Data

(63) Continuation of application No. PCT/CN2017/114770, filed on Dec. 6, 2017.

(30) Foreign Application Priority Data

May 11, 2017 (CN) .......................... 2017 1 0330881

(51) Int. Cl.
| | | |
|---|---|---|
| *H04B 10/07* | (2013.01) | |
| *H04B 10/079* | (2013.01) | |
| *H04B 10/071* | (2013.01) | |
| *H04B 10/25* | (2013.01) | |

(52) U.S. Cl.
CPC ..... *H04B 10/07953* (2013.01); *H04B 10/071* (2013.01); *H04B 10/25891* (2020.05)

(58) Field of Classification Search
CPC ............ H04B 10/07953; H04B 10/071; H04B 10/2504; H04B 10/58; H04B 10/5161
See application file for complete search history.

(56) References Cited

U.S. PATENT DOCUMENTS

| | | | |
|---|---|---|---|
| 6,765,659 B1 | 7/2004 | Bhatnagar et al. | |
| 9,246,587 B2 | 1/2016 | Bliss et al. | |
| 2005/0286905 A1* | 12/2005 | Mohs ................... | H04B 10/564 398/160 |
| 2006/0013183 A1 | 1/2006 | Lee et al. | |

(Continued)

FOREIGN PATENT DOCUMENTS

| | | |
|---|---|---|
| CN | 102508266 A | 6/2012 |
| CN | 103378904 A | 10/2013 |

(Continued)

*Primary Examiner* — Dzung D Tran
(74) *Attorney, Agent, or Firm* — Rimon PC

(57) ABSTRACT

A method for detecting an MPI noise problem. The method includes: receiving a first signal, where the first signal includes a service signal sent by a sending device and an MPI noise signal generated by an MPI noise generator, and the MPI noise generator is disposed between the sending device and a receiving device of the service signal; determining whether a packet loss occurs in the service signal; and when a packet loss occurs in the service signal, determining that there is an MPI noise problem in an optical fiber link between the sending device and the receiving device. Therefore, when a packet loss occurs in a service signal that passes through an optical fiber link between a transmit end and a receive end, it can be determined that there is an MPI noise problem in the optical fiber link.

14 Claims, 5 Drawing Sheets

(56) References Cited

U.S. PATENT DOCUMENTS

| | | | | |
|---|---|---|---|---|
| 2006/0045534 | A1* | 3/2006 | Miyamoto | ....... H04B 10/25253 |
| | | | | 398/148 |
| 2014/0308046 | A1* | 10/2014 | Bliss | .................... H04B 10/697 |
| | | | | 398/147 |
| 2017/0207933 | A1 | 7/2017 | Tiruvur et al. | |
| 2017/0230119 | A1* | 8/2017 | Smith | ................ H04B 10/2507 |

FOREIGN PATENT DOCUMENTS

| | | |
|---|---|---|
| CN | 104506241 A | 4/2015 |
| CN | 105791188 A | 7/2016 |
| CN | 106033998 A | 10/2016 |
| CN | 106100747 | 11/2016 |
| CN | 106556415 A | 4/2017 |

\* cited by examiner

METHOD AND APPARATUS FOR DETECTING MPI NOISE PROBLEM

CROSS-REFERENCE TO RELATED APPLICATION

This application is a continuation of International Application No. PCT/CN2017/114770, filed on Dec. 6, 2017 and claiming priority to Chinese Patent Application No. 201710330881.7, filed on May 11, 2017. The disclosures of the aforementioned applications are hereby incorporated by reference in their entireties.

TECHNICAL FIELD

This application relates to optical fiber systems, and more specifically, to a multi-path interference (MPI) noise generator, and a method, an apparatus, and a system for detecting MPI noise problems.

BACKGROUND

Connectors are needed to connect optical fibers in an optical fiber system. Dirty end faces or tiny air gaps in the connectors cause increased optical return losses (ORL). For example, MPI noises are generated when a signal is reflected back and forth between the end faces of the connectors. When the MPI noise is mixed with the original signal, the signal-to-noise ratio (SNR) of the original signal goes down and the system performance deteriorates.

Generally, most optical fiber communications systems have an anti-MPI capability, and when MPI noise is relatively weak, the performance of an optical fiber system normally is not affected.

When the MPI noise in an optical fiber system is lower than the critical or threshold MPI noise value, the optical fiber system can still operate normally. However, in this case, even if the optical fiber system can operate normally, the optical fiber system may be in a meta-stable state. To be specific, the optical fiber system can run stably during a short time period. However, once the system is disturbed by the outside influence, for example, when an optical return loss of an optical fiber connector slightly deteriorates and a polarization state is temporarily aligned, the system deviates from the stable state and a packet loss occurs, which can lead to a system crash. Although MPI interference does not occur in a short period, there is a potential risk. Therefore, in practical application, a potential MPI noise problem needs to be addressed. However, in an existing method for detecting MPI noise, for example, an optical time domain reflectometer (OTDR) cannot quickly and directly identify a potential MPI noise problem in the optical fiber system.

Therefore, how to detect a potential MPI noise problem in an optical fiber system needs to be solved.

SUMMARY

Embodiments of the present disclosure provide an MPI noise generator, and a method, an apparatus, and a system for detecting an MPI noise problem.

According to a first aspect, a method for detecting a multi-path interference MPI noise problem is provided, where the method includes:

receiving a first signal, where the first signal includes a service signal sent by a sending device and an MPI noise signal generated by an MPI noise generator, and the MPI noise generator is disposed between the sending device and a receiving device;

determining whether a packet loss occurs in the service signal; and when a packet loss occurs in the service signal, determining that there is an MPI noise problem in an optical fiber link between the sending device and the receiving device.

Therefore, in this embodiment of the present disclosure, when the MPI noise generator is disposed in the optical fiber system (for example, the optical fiber link between a transmit end and a receive end), when a packet loss occurs in a service signal, it can be determined that there is an MPI noise problem in the optical fiber link. Therefore, in this embodiment of the present disclosure, a problem in the prior art is resolved, and a potential MPI noise problem in the optical fiber system can be detected.

Optionally, in an implementation of the first aspect, the sending device and the receiving device are in a normal operating state.

Optionally, in this embodiment of the present disclosure, the sending device and the receiving device may perform self-detection, for example, back-to-back testing, to ensure that the sending device and the receiving device can run normally. For example, the sending device or the receiving device may connect its transmit end and its receive end, and when its receive end can accurately receive a signal sent by its transmit end, it may be considered that the sending device or the receiving device is in a normal operating state.

Optionally, the sending device sends the service signal, and the service signal is added or included into the first signal after passing through the optical fiber system (which may be the optical fiber link between the receiving device and the sending device herein) and the MPI noise generator.

It should be understood that in this embodiment of the present disclosure, the service signal may be a normal service signal or a test signal. For example, the test signal is a signal dedicated to testing MPI noise problems. This embodiment of the present disclosure is not limited thereto.

It should be understood that, in this embodiment of the present disclosure, the sending device is relative to the receiving device. The sending device corresponds to the transmit end of a signal, and the receiving device corresponds to the receive end of a signal. The name of the sending device and the receiving device may be exchangeable, and this is not limited in this embodiment of the present disclosure.

After receiving the first signal, the apparatus (for example, the receiving device) for detecting an MPI noise problem may analyze the first signal to detect whether a packet loss has occurred in the service signal.

It should be understood that, in this embodiment of the present disclosure, when the receiving device receives an incomplete service signal (a packet loss occurs) or a bit error occurs in the service signal, it is considered that a packet loss has occurred in the service signal. When the receiving device receives a complete service signal (no packet loss occurs) and no bit error occurs in the service signal, it is considered that no packet loss has occurred in the service signal.

Optionally, in an implementation of the first aspect, the method further includes:

triggering indication information to be sent to a user, where the indication information is used to instruct a user to maintain an optical fiber connector in the optical fiber link.

Optionally, in an implementation of the first aspect, the sending device and the receiving device are in a normal operating state.

For example, the apparatus for detecting an MPI noise problem may send an indication signal or an indicator, to indicate to a user that there is an MPI noise problem in the optical fiber link; or the apparatus for detecting an MPI noise problem may display the indication information on a display screen, to indicate to a user that there is an MPI noise problem in the optical fiber link; or the apparatus for detecting an MPI noise problem may send an alarm sound or the like using a sounder, to indicate to a user that there is an MPI noise problem in the optical fiber link. This embodiment of the present disclosure is not limited thereto. After obtaining the indication information, the user may maintain the optical fiber connector to reduce or avoid MPI noise in the link.

Optionally, after obtaining the indication information, the user may clean all optical fiber connectors or remove air gaps of all optical fiber connectors in the optical fiber link. The user may alternatively use an OTDR to detect optical fiber connectors in the optical fiber link, and handle some optical fiber connectors that have relatively serious problems, for example, handle those optical fiber connectors that have been polluted relatively seriously or have relatively large air gaps. It should be understood that, in this embodiment of the present disclosure, after the user obtains the indication information, the maintenance operation for the optical fiber connectors is not limited, provided that when an MPI noise problem is detected in the optical fiber link, MPI noise in the optical fiber link can be reduced or avoided after the maintenance. The maintenance operation for the optical fiber connectors is not limited in this embodiment of the present disclosure.

Optionally, in an implementation of the first aspect, the method further includes:

when no packet loss occurs in the service signal, determining that there is no MPI noise problem in the optical fiber link between the sending device and the receiving device.

Optionally, when no packet loss occurs in the service signal, it indicates that MPI noise in the optical fiber system is considerably weak, the optical fiber system has considerably strong anti-MPI noise interference capability, and no MPI noise problem exists in the optical fiber system.

Therefore, in this embodiment of the present disclosure, when the MPI noise generator is disposed in the optical fiber system (for example, the optical fiber link between the transmit and the receive end), whether there is an MPI noise problem in the optical fiber link can be determined depending on whether a packet loss occurs in the service signal. Therefore, in this embodiment of the present disclosure, a problem in the prior art is resolved, and a potential MPI noise problem in the optical fiber system can be detected.

According to a second aspect, an apparatus for detecting a multi-path interference MPI noise problem is provided, and is configured to perform the method in the first aspect or any one of the possible implementations of the first aspect. Optionally, the apparatus for detecting a multi-path interference MPI noise problem includes a unit configured to perform the foregoing method.

According to a third aspect, a multi-path interference MPI noise generator is provided, where the multi-path interference MPI noise generator includes:

an input end, configured to receive a service signal sent by a sending device;

a processing module, configured to process the service signal to generate MPI noise; and an output end, configured to send the service signal and the MPI noise to a receiving device.

Therefore, in this embodiment of the present disclosure, the MPI noise generator generates MPI noise, and then an apparatus for detecting a multi-path interference MPI noise problem may be configured to detect an MPI noise problem in an optical fiber system, especially in an optical fiber link between the sending device and the receiving device when the MPI noise is set, to determine whether there is an MPI noise problem in the optical fiber link.

It should be understood that there may be a plurality of forms of the processing module in this embodiment of the present disclosure, provided that the processing module can process the service signal to generate MPI noise.

Optionally, in an implementation of the third aspect, the processing module includes:

a coupler, configured to decompose a second signal from the service signal;

a decorrelator, where the decorrelator is configured to perform first processing on the second signal to form the MPI noise, and the first processing is used to remove coherence between the second signal and the service signal; and a combiner, configured to couple the MPI noise to the service signal to form a first signal.

Optionally, the coupler may be connected to the input end, and is configured to decompose the second signal (also referred to as a tributary signal) from the service signal. For example, the coupler may also be referred to as an optical coupler, and may decompose or divert 1/10 (10%) of the service signal (also referred to as a primary signal) to form a second signal.

The decorrelator may be connected to the coupler, and is configured to perform first processing on the second signal to form the MPI noise, where the first processing is used to remove coherence between the second signal and the service signal.

For example, the decorrelator may be an optical fiber delay line, and the decorrelator may remove symbol coherence between the second signal and the primary signal to form random noise, namely, the MPI noise.

The combiner is configured to couple the MPI noise to the service signal to form the first signal. The combiner may be connected to the output end to transmit the first signal to the output end.

It should be understood that the combiner may also be an optical coupler. A specific form of the combiner is not limited in this embodiment of the present disclosure, provided that the combiner can couple the service signal to a noise signal.

Optionally, in an implementation of the third aspect, all components in the MPI noise source are connected through a polarization maintaining optical fiber, and the processing module further includes:

a polarization module, where the polarization module is configured to adjust a polarization state of the service signal to be the same as a polarization state of the MPI noise.

Optionally, in an implementation of the third aspect, the polarization module includes:

a first polarizer, configured to adjust the polarization state of the service signal to a first polarization state; and a second polarizer, configured to adjust the polarization state of the MPI noise to the first polarization state.

It should be understood that the polarization maintaining optical fiber may keep a polarization state unchanged during optical signal transmission. To be specific, when the polarization module adjusts the polarization state of the service signal to be the same as the polarization state of the MPI noise, the polarization maintaining optical fiber may keep the polarization states of the service signal and the MPI noise the same.

Therefore, in this embodiment of the present disclosure, the polarization module may adjust the polarization state of the service signal to be the same as the polarization state of the MPI noise, to increase interference of the MPI noise with the service signal. Further, the apparatus for detecting a multi-path interference MPI noise problem may detect the first signal, in order to detect whether there is an MPI noise problem in the optical fiber link.

It should be understood that the polarizer in this specification may be a polarization controller and may be configured to control a polarization state of an optical signal. For example, the polarizer may convert a circularly polarized light or an elliptically polarized light into a linearly polarized light, and fix the polarization state of the optical signal as a linear polarization state.

Optionally, in an implementation of the third aspect, the MPI noise generator further includes:

an adjuster, configured to adjust an intensity of the MPI noise.

For example, the adjuster may be an attenuator, such as a fixed attenuator, and may adjust an intensity of the MPI noise using a fixed attenuation.

It should be understood that the adjuster is an optional component. In this embodiment of the present disclosure, the intensity of the MPI noise may be adjusted by the attenuator. Optionally, the component may not be used in this embodiment of the present disclosure. In a practical application, the intensity of the MPI noise may be adjusted by setting a dimension of the coupler. For example, if the coupler generates a stronger second signal out of the first signal, the corresponding MPI noise is stronger; and if the coupler generates a weaker second signal, the corresponding MPI noise is weaker.

Optionally, in an implementation of the third aspect, the processing module includes:

at least one optical fiber connector, where the at least one optical fiber connector is configured to generate MPI noises.

For example, the optical fiber connector is a specific type of optical fiber connector, such as, a square connector (SC), a ferrule connector (FC), and a Lucent connector-physical contact (LC-PC) optical fiber connector. The optical fiber connector has a specific reflectivity, such that when the service signal passes through the optical fiber connector 426, the MPI noise is generated.

Optionally, in an implementation of the third aspect, the at least one optical fiber connector is connected through a polarization maintaining optical fiber.

The processing module further includes:

a polarization module, where the polarization module is configured to adjust the polarization state of the service signal to be the same as the polarization state of the MPI noise.

For example, the polarization module may be a polarizer.

It should be understood that the polarization maintaining optical fiber may keep a polarization state unchanged during optical signal transmission. The polarization maintaining optical fiber may be set with a specific optical fiber length, to remove symbol coherence between a signal and a reflected signal, and maintain phase coherence between the two signals. In other words, when the polarization module adjusts the polarization state of the service signal to be the same as the polarization state of the MPI noise, the polarization maintaining optical fiber may keep the polarization states of the service signal and the MPI noise the same.

Therefore, in this embodiment of the present disclosure, the polarization module may adjust the polarization state of the service signal to be the same as the polarization state of the MPI noise, to increase interference of the MPI noise with the service signal. Further, the apparatus for detecting a multi-path interference MPI noise problem may detect the first signal, in order to determine whether there is an MPI noise problem in the optical fiber link.

According to a fourth aspect, a system for detecting a multi-path interference MPI noise problem is provided, where the system includes:

the MPI noise generator in any one of the third aspect and the optional implementations of the third aspect, and the apparatus for detecting an MPI noise problem in the second aspect and optional implementations of the second aspect.

According to a fifth aspect, a computer readable medium is provided, and where the computer readable medium stores a computer program, and the computer program is executed by a computer to implement the method in the first aspect or any one of the possible implementations of the first aspect.

According to a sixth aspect, a computer program product is provided, where the computer program product is executed by a computer to implement the method in the first aspect or any one of the possible implementations of the first aspect.

DESCRIPTION OF EMBODIMENTS

The following describes technical solutions of this application with reference to the accompanying drawings.

Figure 1:
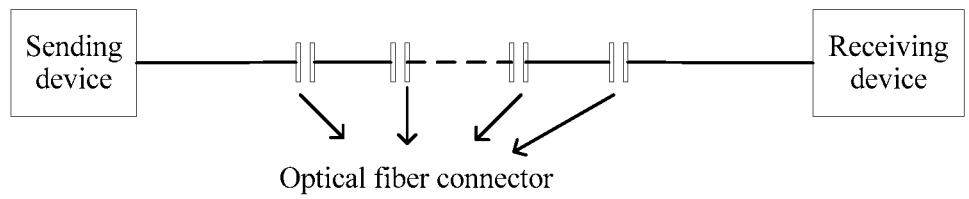
FIG. 1 is a schematic diagram of a scenario of an optical fiber system to which the embodiments of the present disclosure can be applied.

FIG. 1 is a schematic diagram of an embodiment of an optical fiber system to which the embodiments of the present disclosure can be applied. The optical fiber system shown in FIG. 1 includes a sending device (also referred to as a transmitter, a transmit end, or a transmit end device), a receiving device (also referred to as a receiver, a receive end, or a receive end device), and an optical fiber link connecting the sending device and the receiving device. As shown in FIG. 1, the optical fiber link includes a plurality of optical fiber connectors.

The system shown in FIG. 1 may be a pulse amplitude modulation 4 (PAM4) system, but this embodiment of the present disclosure is not limited thereto. For example, the system shown in FIG. 1 may also be a non-return to zero (NRZ) code system, a pulse amplitude modulation 8 (PAM8) system, or a pulse amplitude modulation 16 (PAM16) system.

Dirty end faces or tiny air gaps in optical fiber connectors result in increased optical return loss (ORL) of some connectors. For example, a signal may be reflected back and forth between the end faces of the connectors to form MPI noise. The MPI noise is mixed with an original signal, resulting in deterioration of a signal-to-noise ratio (SNR) of the original signal and deterioration of system performance. When there is MPI noise in the optical fiber system but the MPI noise is lower than a threshold value of MPI noise that would affect normal operation of the system, the optical fiber system can still operate normally. However, in this case, even if the optical fiber system can operate normally, the optical fiber system may be in a meta-stable state. To be specific, the optical fiber system can run stably in a short period. However, once the system is disturbed by the outside influence, for example, when an optical return loss of an optical fiber connector has slightly deteriorated and a polarization state is immediately aligned, the system deviates from the stable state and a packet loss occurs, causing in a system crash. Although MPI interference does not occur in a short period, there is a potential risk in this state. Therefore, in practical application, a potential MPI noise problem needs to be eliminated.

The embodiments of the present disclosure provide a solution for detecting an MPI noise problem. Optionally, in the embodiments of the present disclosure, an additional MPI noise generator is added to an optical fiber system. If there is MPI noise in the optical fiber system, the MPI noise generated by the MPI noise generator and the existing MPI noise (caused by signals being reflected between connectors in the optical fiber system) in the optical fiber system are mixed to form relatively strong MPI noises. In this case, if the receiving device can still normally receive a signal sent by the sending device and keep running stably, the optical fiber system will be in a stable state after the MPI noise generator is removed or turned off. If a packet loss/an uncorrectable bit error occurs in the receiving device when the MPI noise generator is added or turned on, it indicates that there is an MPI noise risk in the optical fiber system. Therefore, a user may manually adjust the optical fiber system, for example, clear optical fiber connectors in the optical fiber system or remove air gaps in optical fiber connectors to stabilize the optical fiber system.

As examples instead of limitations, the following describes the embodiments of the present disclosure in detail with reference to related accompanying drawings.

First, the term "MPI noise problem" in the embodiments of the present disclosure is defined as follows: the "MPI noise problem" in an optical fiber system or an optical fiber link indicates that the optical fiber system or the optical fiber link is in an unstable state and has a weak anti-MPI interference capability and a potential hazard; and no "MPI noise problem" in the optical fiber system or the optical fiber link indicates that the optical fiber system or the optical fiber link is in a stable state and has a strong anti-MPI interference capability.

Figure 2:
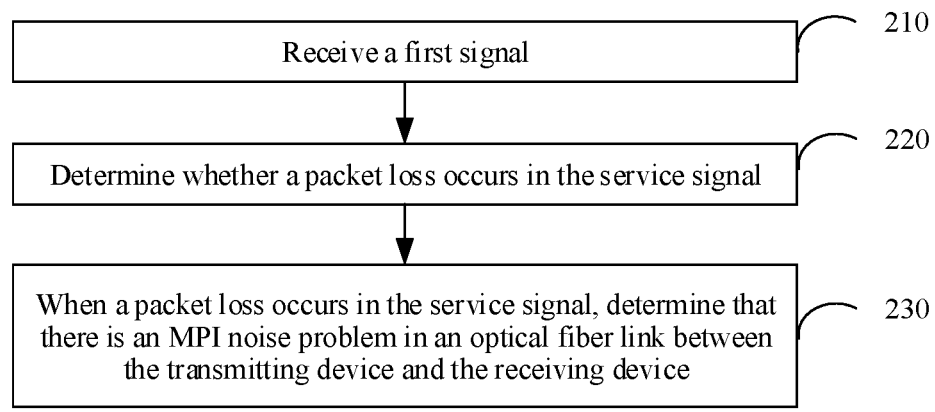
FIG. 2 is a flowchart of a method for detecting an MPI noise problem according to an embodiment of the present disclosure.

FIG. 2 is a flowchart of a method for detecting a multi-path interference MPI noise problem according to an embodiment of the present disclosure. The method shown in FIG. 2 may be performed by an apparatus for detecting a multi-path interference MPI noise problem. The apparatus may be a receiving device, or may be an independent component disposed in the receiving device. This embodiment of the present disclosure is not limited thereto.

In one embodiment, as shown in FIG. 2, the method 200 includes the following steps.

210. Receive a first signal.

The first signal includes a service signal sent by a sending device and an MPI noise signal generated by an MPI noise generator, and the MPI noise generator is disposed between the sending device and the receiving device of the service signal.

In one embodiment, the sending device sends the service signal, and the service signal is included in the first signal after passing through an optical fiber system (which may be an optical fiber link between the receiving device and the sending device herein) and the MPI noise generator.

It can be understood that the term "first" in this embodiment of the present disclosure is merely for convenience of description and understanding, and should not constitute any limitation on this embodiment of this application.

It should be understood that in this embodiment of the present disclosure, the service signal may be a normal service signal or a test signal. For example, the test signal is a signal dedicated to testing an MPI noise problem. This embodiment of the present disclosure is not limited thereto.

It should be understood that, in this embodiment of the present disclosure, the sending device is relative to the receiving device. The sending device corresponds to the transmit end of a signal, and the receiving device corresponds to the receive end of a signal. The names of the sending device and the receiving device may be interchangeable, and this is not limited in this embodiment of the present disclosure.

In this embodiment of the present disclosure, after the service signal passes through the MPI noise generator, MPI noise is generated. In one embodiment, for an exemplary structure of the MPI noise generator and a principle of generating MPI noise, refer to the following detailed descriptions with reference to FIG. 4 to FIG. 6. Details are not described herein.

Optionally, in another embodiment, to ensure accuracy of the method for detecting an MPI noise problem in this embodiment of the present disclosure, before the sending device sends a service signal, it is necessary to ensure that the sending device and the receiving device can operate normally or in a normal operating state.

Optionally, in this embodiment of the present disclosure, the sending device and the receiving device may perform self-detection, for example, back-to-back testing, to ensure that the sending device and the receiving device can run normally. For example, the sending device or the receiving device may connect its transmit end and its receive end, and when its receive end can accurately receive a signal sent by its transmit end, it may be considered that the sending device or the receiving device is in a normal operating state.

220. Determine whether a packet loss occurs in the service signal.

In one embodiment, after receiving the first signal, the apparatus (for example, the receiving device) for detecting an MPI noise problem may analyze the first signal to detect whether a packet loss occurs in the service signal.

In one embodiment, when the receiving device receives an incomplete service signal (a packet loss occurs) or a bit error occurs in the service signal, it is considered that a packet loss occurs in the service signal. When the receiving device receives a complete service signal (no packet loss occurs) and no bit error occurs in the service signal, it is considered that no packet loss occurs in the service signal.

230. When a packet loss occurs in the service signal, determine that there is an MPI noise problem in the optical fiber link between the sending device and the receiving device.

In one embodiment, when a packet loss occurs in the service signal in the first signal received by the receiving device, it indicates that there is an MPI noise problem in the optical fiber system or the optical fiber link between the sending device and the receiving device.

Optionally, when it is determined that there is an MPI noise problem, the method 200 further includes: triggering indication information to be sent, where the indication information is used to instruct a user to maintain an optical fiber connector in the optical fiber link.

For example, the apparatus for detecting an MPI noise problem may send an indication signal using an indicator, to indicate to a user that there is an MPI noise problem in the optical fiber link; or the apparatus for detecting an MPI noise problem may display the indication information on a display screen, to indicate to a user that there is an MPI noise problem in the optical fiber link; or the apparatus for detecting an MPI noise problem may send an alarm sound or the like using a sounder, to indicate to a user that there is an MPI noise problem in the optical fiber link. This embodiment of the present disclosure is not limited thereto. After obtaining the indication information, the user may maintain the optical fiber connector to reduce or eliminate MPI noise in the link.

In one embodiment, after obtaining the indication information, the user may clean all optical fiber connectors or remove air gaps of all optical fiber connectors in the optical fiber link. The user may alternatively use an OTDR to detect optical fiber connectors in the optical fiber link, and handle some optical fiber connectors that have relatively serious problems, for example, handle some optical fiber connectors that are polluted relatively seriously or have relatively large air gaps. It should be understood that, in this embodiment of the present disclosure, after the user obtains the indication information, the maintenance operation for the optical fiber connectors is not limited, provided that when an MPI noise problem is detected in the optical fiber link, MPI noise in the optical fiber link can be reduced or eliminated after the maintenance. The maintenance manner for the optical fiber connectors is not limited in this embodiment of the present disclosure.

Alternatively, in this embodiment of the present disclosure, when no packet loss occurs in the service signal, it is determined that there is no MPI noise problem in the optical fiber link between the transmit end and the receive end.

In one embodiment, when no packet loss occurs in the service signal, it is an indication that the MPI noise in the optical fiber system is considerably weak, the optical fiber system has considerably strong anti-MPI noise interference capability, and no MPI noise problem exists in the optical fiber system.

Therefore, in this embodiment of the present disclosure, when the MPI noise generator is disposed in the optical fiber system (for example, the optical fiber link between the transmit and the receive end), whether there is an MPI noise problem in the optical fiber link can be determined depending on whether a packet loss occurs in the service signal. Therefore, in this embodiment of the present disclosure, a problem in the prior art is resolved, and a potential MPI noise problem in the optical fiber system can be detected.

Figure 3:
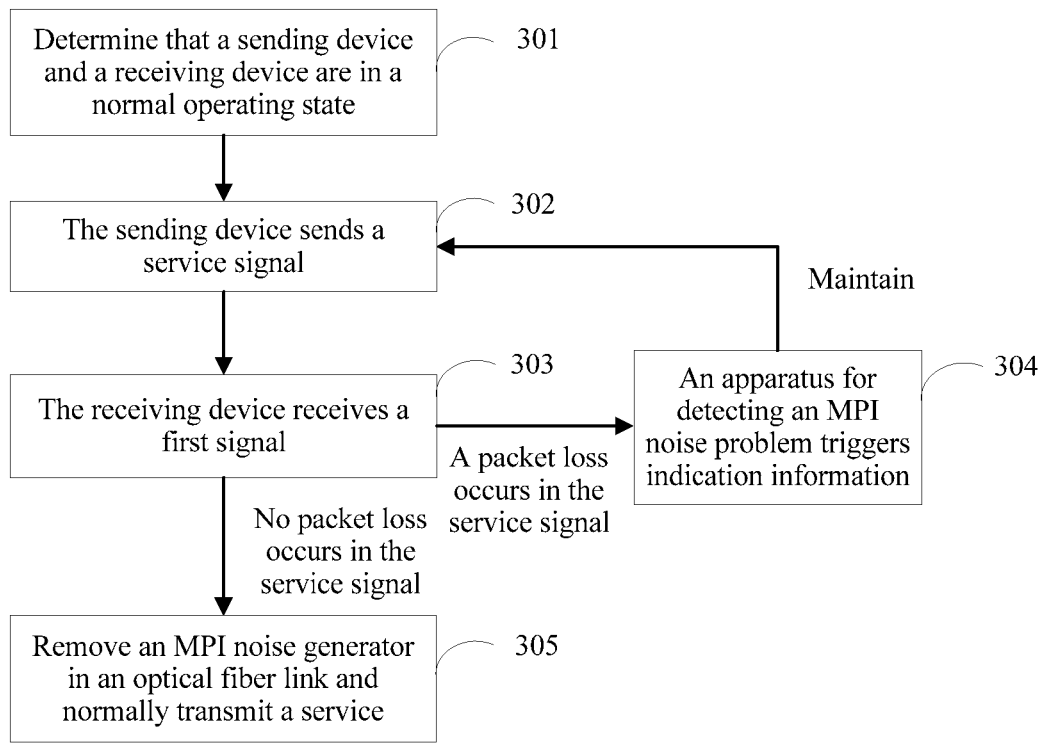
FIG. 3 is a flowchart of a method for detecting an MPI noise problem according to another embodiment of the present disclosure.

With reference to a specific embodiment in FIG. 3, the following describes in detail a method for detecting a multi-path interference MPI noise problem in this embodiment of the present disclosure. In one embodiment, as shown in FIG. 3, the method 300 includes the following steps.

301. Determine that a sending device and a receiving device are in a normal operating state.

For example, the sending device and the receiving device may perform self-detection, for example, back-to-back testing, to ensure that the sending device and the receiving device can run normally. For example, the sending device or the receiving device may connect its transmit end and its receive end, and when its receive end can receive a signal sent by its transmit end, it may be considered that the sending device or the receiving device is in a normal operating state.

302. The sending device sends a service signal.

For example, the service signal is included into a first signal after passing through an optical fiber system (which may be an optical fiber link between the receiving device and the sending device herein) and an MPI noise generator.

It should be understood that in this embodiment of the present disclosure, the service signal may be a normal service signal or a test signal. For example, the test signal is a signal dedicated to testing an MPI noise problem. This embodiment of the present disclosure is not limited thereto.

In this embodiment of the present disclosure, after the service signal passes through the MPI noise generator, the MPI noise is generated, and the MPI noise and the service signal form the first signal.

303. The receiving device receives the first signal.

The receiving device analyzes the first signal to determine whether a packet loss occurs in the service signal.

In one embodiment, after receiving the first signal, the receiving device may analyze the first signal to detect whether a packet loss occurs in the service signal.

When a packet loss occurs in the service signal included in the first signal received by the receiving device, step 304 is performed.

In one embodiment, when a packet loss occurs in the service signal included in the first signal received by the receiving device, it indicates that there is an MPI noise problem in the optical fiber link between the sending device and the receiving device, and manual intervention needs to be performed. For example, a user needs to perform maintenance to reduce or eliminate the MPI noise problem.

When no packet loss occurs in the service signal, step 305 is performed.

In one embodiment, when no packet loss occurs in the service signal received by the receive end, it is determined that there is no MPI noise problem in the optical fiber link between the transmit end and the receive end, and service signals can be normally transmitted.

304. An apparatus for detecting an MPI noise problem triggers indication information to be sent.

In one embodiment, the indication information is used to instruct a user to maintain an optical fiber connector in the optical fiber link.

For example, the apparatus for detecting an MPI noise problem may send an indication signal using an indicator, to indicate to a user that there is an MPI noise problem in the optical fiber link, or display the indication information on a display screen, to indicate to a user that there is an MPI noise problem in the optical fiber link, or send an alarm sound or the like using a sounder, to indicate to a user that there is an MPI noise problem in the optical fiber link. This embodiment of the present disclosure is not limited thereto.

After obtaining the indication information, the user may maintain the optical fiber connector to reduce or eliminate MPI noise in the link. In one embodiment, for a maintenance operation of a user, refer to the foregoing descriptions. Details are not described herein again.

After step 304 is performed, step 302 is performed for detection again. When no packet loss occurs in the service signal received by the receiving device, step 305 is performed.

305. Remove the MPI noise generator in the optical fiber link and normally transmit a service signal.

When no packet loss occurs in the service signal received by the receive end, it is determined that there is no MPI noise problem in the optical fiber link between the transmit end and the receive end. After the MPI noise generator is removed, a service can be normally transmitted between the sending device and the receiving device.

It should be noted that, the examples in FIG. 2 to FIG. 3 are only intended to help a person skilled in the art understand the embodiments of the present disclosure rather than restricting the embodiments of the present disclosure to a specific numerical value or a specific scenario that is illustrated. A person skilled in the art apparently can make various equivalent modifications or changes according to the examples shown in FIG. 2 to FIG. 3, and such modifications or changes also fall within the scope of the embodiments of this application.

It should be understood that the sequence numbers of the processes in FIG. 2 to FIG. 3 do not mean execution sequences. The execution sequences of the processes should be determined based on functions and internal logic of the processes, and shall not constitute any limitation on the implementation processes of the embodiments of this application.

The foregoing describes in detail the method for detecting a multi-path interference MPI noise problem in the embodiments of the present disclosure with reference to FIG. 2 and FIG. 3. The following describes in detail the MPI noise generator in the embodiments of the present disclosure with reference to FIG. 4 to FIG. 8.

As described above, the MPI noise generator may be disposed between a sending device and a receiving device of a service signal. For example, the MPI noise generator may be disposed in an optical fiber link between the sending device and the receiving device, and the MPI noise generator may generate MPI noise based on a service signal sent by the sending device.

Figure 4:
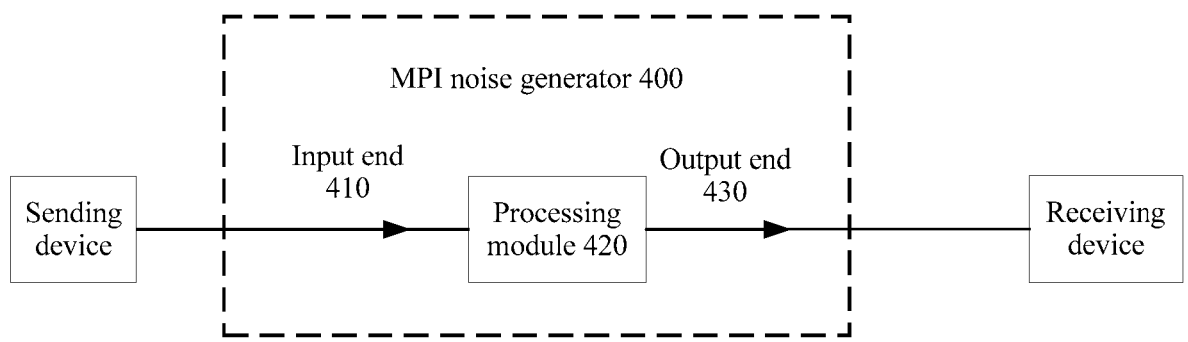
FIG. 4 is a schematic diagram of an MPI noise generator according to an embodiment of the present disclosure.

As shown in FIG. 4, the MPI noise generator 400 includes:

an input end 410, configured to receive a service signal sent by a sending device;

a processing module 420, configured to process the service signal to generate MPI noise; and an output end 430, configured to send the service signal and the MPI noise to a receiving device.

In one embodiment, the input end 410 is connected to the sending device, for example, the input end 410 is connected to an output end of the sending device. The output end 430 is connected to the receiving device, for example, the output end 430 is connected to an input end of the receiving device.

It should be understood that there may be a plurality of implementations of the processing module 420 in this embodiment of the present disclosure, provided that the processing module 420 can process the service signal to generate MPI noise.

Therefore, in this embodiment of the present disclosure, the MPI noise generator generates MPI noise, and then an apparatus for detecting a multi-path interference MPI noise problem may detect an MPI noise problem in an optical fiber system, especially in an optical fiber link between the sending device and the receiving device when the MPI noise is set, to determine whether there is an MPI noise problem in the optical fiber link.

The following describes in detail the processing module 420 in the MPI noise generator in this embodiment of the present disclosure with reference to FIG. 5 to FIG. 8. However, this embodiment of the present disclosure is not limited thereto.

Figure 5:
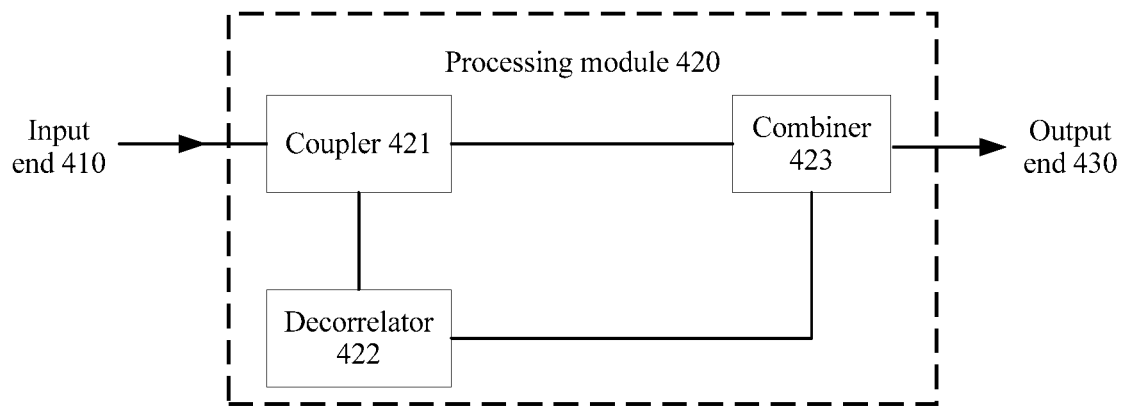
FIG. 5 is a schematic block diagram of an MPI noise generator according to another embodiment of the present disclosure.

As shown in FIG. 5, the processing module 420 may include a coupler 421, a decorrelator 422, and a combiner 423.

In one embodiment, the coupler 421 may be connected to the input end 410, and is configured to create a second signal (also referred to as a tributary signal) from the service signal. For example, the coupler 421 may also be referred to as an optical coupler, and may decompose 1/10 of the service signal (also referred to as a primary signal) to form the second signal.

The decorrelator 422 may be connected to the coupler 421, and is configured to perform first processing on the second signal to form the MPI noise, where the first processing is used to remove coherence between the second signal and the service signal.

For example, the decorrelator 422 may be an optical fiber delay line, and the decorrelator 422 may remove symbol coherence between the second signal and the primary signal to form random noise, namely, the MPI noise.

The combiner 423 is configured to couple the MPI noise to the service signal to form a first signal. The combiner 423 may be connected to the output end to transmit the first signal to the output end 430.

It should be understood that the combiner 423 may also be an optical coupler. A specific form of the combiner 423 is not limited in this embodiment of the present disclosure, provided that the combiner 423 can couple the service signal to a noise signal.

Figure 6:
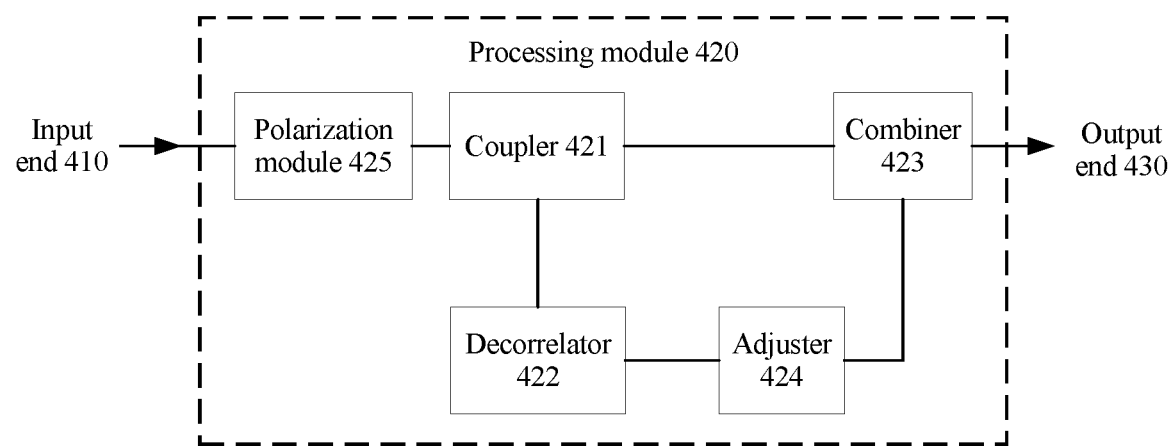
FIG. 6 is a schematic block diagram of an MPI noise generator according to a third embodiment of the present disclosure.

Optionally, as shown in FIG. 6, the processing module 420 may further include an adjuster 424, and the adjuster 424 may adjust an intensity of the MPI noise.

For example, the adjuster 424 may be an attenuator, such as a fixed attenuator, and may adjust an intensity of the MPI noise using a fixed attenuation.

It should be understood that the adjuster 424 is an optional component. In this embodiment of the present disclosure, the intensity of the MPI noise may be adjusted by the attenuator 424. Optionally, the component may not be disposed in this embodiment of the present disclosure. In practical application, the intensity of the MPI noise may be adjusted by setting a dimension of the coupler 421. For example, if the coupler 421 decomposes a stronger second signal, the corresponding MPI noise is stronger; and if the coupler 421 decomposes a weaker second signal, the corresponding MPI noise is weaker.

Optionally, in another embodiment, as shown in FIG. 6, all components in the MPI noise source are connected through a polarization maintaining optical fiber.

The processing module 420 may further include:

a polarization module 425, where the polarization module 425 is configured to adjust a polarization state of the service signal to be the same as a polarization state of the MPI noise.

It should be understood that the polarization module 425 may include a polarizer. For example, as shown in FIG. 6, the polarization module 425 is a polarizer directly connected to the input end, and the polarization module is disposed in front of the coupler 421.

Figure 7:
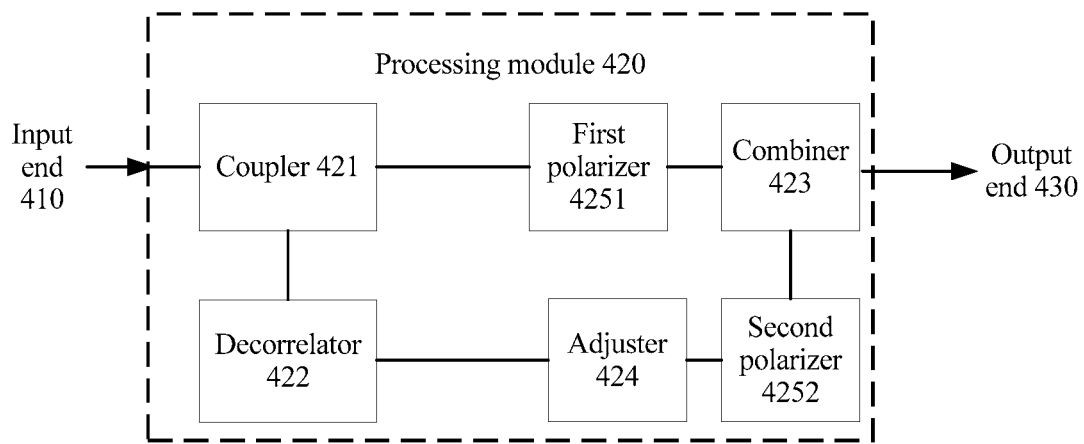
FIG. 7 is a schematic block diagram of an MPI noise generator according to a fourth embodiment of the present disclosure.

Alternatively, as shown in FIG. 7, the polarization module 425 may include a first polarizer 4251 and a second polarizer 4252. The first polarizer 4251 may be disposed in a main channel, and is configured to adjust a polarization state of the service signal to a first polarization state. The second polarizer 4252 may be disposed in a tributary channel, and is configured to adjust a polarization state of the MPI noise to the first polarization state. It should be understood that the first polarization state may be a linear polarization state, a circular polarization state, or an elliptical polarization state. The embodiment of the present disclosure is not limited thereto.

It should be understood that the polarization maintaining optical fiber may keep a polarization state unchanged during optical signal transmission. To be specific, when the polarization module 425 adjusts the polarization state of the service signal to be the same as the polarization state of the MPI noise, the polarization maintaining optical fiber may always keep the polarization states of the service signal and the MPI noise the same.

Therefore, in this embodiment of the present disclosure, the polarization module may adjust the polarization state of the service signal to be the same as the polarization state of the MPI noise, to maximize interference of the MPI noise with the service signal. Further, the apparatus for detecting a multi-path interference MPI noise problem may detect the first signal, to detect whether there is an MPI noise problem in the optical fiber link.

It should be understood that the polarizer in this specification may be a polarization controller, and may be configured to control a polarization state of an optical signal. For example, the polarizer may convert a circularly polarized light or an elliptically polarized light into a linearly polarized light, and fix the polarization state of the optical signal as a linear polarization state.

Figure 8:
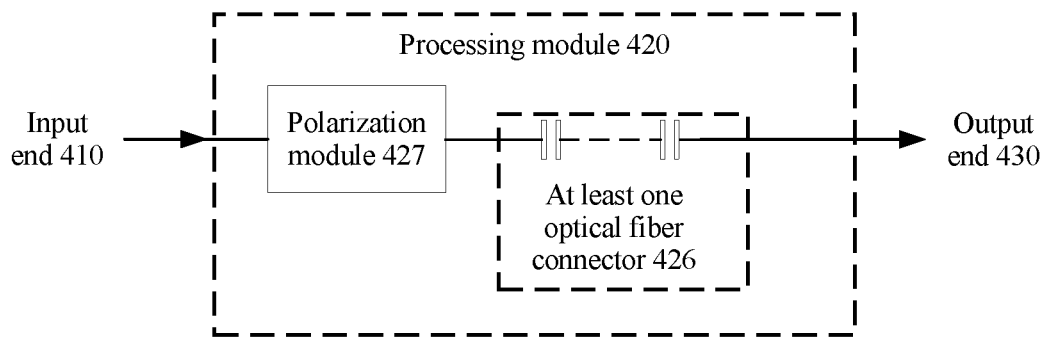
FIG. 8 is a schematic block diagram of an MPI noise generator according to a fifth embodiment of the present disclosure.

As shown in FIG. 8, the processing module 420 may further include:

at least one optical fiber connector 426, where the at least one optical fiber connector 426 is configured to generate the MPI noise.

For example, the optical fiber connector 426 may be a specific type optical fiber connector, such as, a square connector (SC), a ferrule connector (FC), and a Lucent connector-physical contact (LC-PC) optical fiber connector. The optical fiber connector has a specific reflectivity, such that when the service signal passes through the optical fiber connector 426, the MPI noise is generated.

Optionally, the at least one optical fiber connector is connected thorough a polarization maintaining optical fiber.

The processing module 420 may further include:

a polarization module 427, where the polarization module 427 is configured to adjust a polarization state of the service signal to be the same as a polarization state of the MPI noise.

For example, the polarization module 427 may be a polarizer.

It should be understood that the polarization maintaining optical fiber may keep a polarization state unchanged during optical signal transmission. The polarization maintaining optical fiber may be set with a specific optical fiber length, to remove symbol coherence between a signal and a reflected signal, and maintain phase coherence between the two signals. In other words, when the polarization module 427 adjusts the polarization state of the service signal to be the same as the polarization state of the MPI noise, the polarization maintaining optical fiber may always keep the polarization states of the service signal and the MPI noise the same.

Therefore, in this embodiment of the present disclosure, the polarization module may adjust the polarization state of the service signal to be the same as the polarization state of the MPI noise, to increase interference of the MPI noise with the service signal. Further, the apparatus for detecting a multi-path interference MPI noise problem may detect the first signal, to determine whether there is an MPI noise problem in the optical fiber link.

The foregoing describes the method for detecting an MPI noise problem in the embodiments of the present disclosure with reference to FIG. 2 to FIG. 3, and the MPI noise generator in the embodiments of the present disclosure with reference to FIG. 4 to FIG. 8. The following describes the apparatus for detecting an MPI noise problem in the embodiments of the present disclosure with reference to FIG. 9 and FIG. 10, and the system for detecting an MPI noise problem in the embodiments of the present disclosure with reference to FIG. 11.

Figure 9:
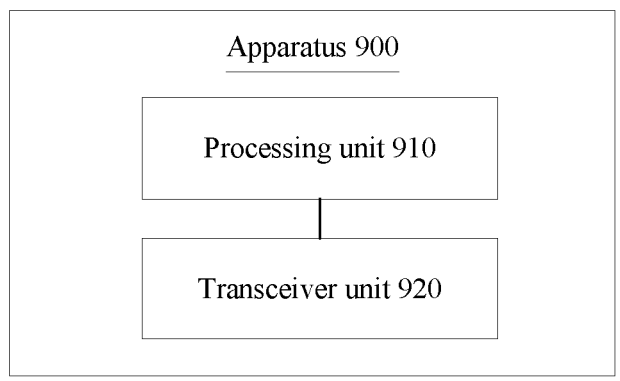
FIG. 9 is a schematic block diagram of an apparatus for detecting an MPI noise problem according to an embodiment of the present disclosure.

FIG. 9 is a schematic block diagram of an apparatus 900 for detecting an MPI noise problem according to an embodiment of the present disclosure. In one embodiment, as shown in FIG. 9, the apparatus 900 includes a processing unit 910 and a transceiver unit 920.

In one embodiment, the transceiver unit is configured to receive a first signal, where the first signal includes a service signal sent by a sending device and an MPI noise signal generated by an MPI noise source, and the MPI noise source is disposed between the sending device and a receiving device of the service signal.

The processing unit is configured to: determine whether a packet loss occurs in the service signal, and when a packet loss occurs in the service signal, determine that there is an MPI noise problem in an optical fiber link between the sending device and the receiving device.

Therefore, in this embodiment of the present disclosure, when an MPI noise generator is disposed in an optical fiber system (for example, an optical fiber link between a transmit end and a receive end), when a packet loss occurs in the service signal, it can be determined that there is an MPI noise problem in the optical fiber link. Therefore, in this embodiment of the present disclosure, a problem in the prior art is resolved, and a potential MPI noise problem in the optical fiber system can be detected.

Optionally, in another embodiment, the processing unit is further configured to trigger indication information to be sent, where the indication information is used to instruct a user to maintain an optical fiber connector in the optical fiber link.

Optionally, in another embodiment, the sending device and the receiving device are in a normal operating state.

Optionally, in another embodiment, the processing unit is further configured to:

when no packet loss occurs in the service signal, determine that there is no MPI noise problem in the optical fiber link between the sending device and the receiving device.

Optionally, in another embodiment, the apparatus is located inside the receiving device.

It should be understood that the apparatus 900 for detecting an MPI noise problem shown in FIG. 9 can implement the processes in the method embodiments of FIG. 2 to FIG. 3. Operations and/or functions of modules in the apparatus 900 for detecting an MPI noise problem are used to implement corresponding processes in the method embodiments of FIG. 2 to FIG. 3 respectively. For details, refer to the descriptions of the method embodiments. To avoid repetition, specific descriptions are appropriately omitted herein.

Figure 10:
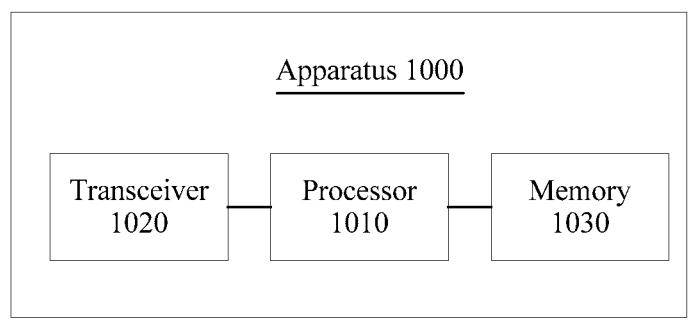
FIG. 10 is a schematic block diagram of an apparatus for detecting an MPI noise problem according to another embodiment of the present disclosure.

FIG. 10 is a schematic block diagram of an apparatus 1000 for detecting an MPI noise problem according to an embodiment of the present disclosure. In one embodiment, as shown in FIG. 10, the terminal apparatus 1000 includes a processor 1010 and a transceiver 1020. The processor 1010 is connected to the transceiver 1020. Optionally, the network apparatus 1000 further includes a memory 1030 connected to the processor 1010. The processor 1010, the memory 1030, and the transceiver 1020 communicate with one another through an internal connection path, to transmit a control signal and/or a data signal. The memory 1030 may be configured to store an instruction. The processor 1010 is configured to execute the instruction stored in the memory 1030, to control the transceiver 1020 to receive and send information or a signal. When executing the instruction stored in the memory 1030, the controller 1010 can complete the processes in the method embodiments of FIG. 2 to FIG. 3. To avoid repetition, details are not described herein again.

It should be understood that the apparatus 1000 for detecting an MPI noise problem may correspond to the apparatus 900 for detecting an MPI noise problem in FIG. 9. A function of the processing unit 910 in the apparatus 900 may be implemented by the processor 1010, and a function of the transceiver unit 920 may be implemented by the transceiver 1020.

Therefore, in this embodiment of the present disclosure, when an MPI noise generator is disposed in an optical fiber system (for example, an optical fiber link between a transmit end and a receive end), when a packet loss occurs in a service signal, it can be determined that there is an MPI noise problem in the optical fiber link. Therefore, in this embodiment of the present disclosure, a problem in the prior art is resolved, and a potential MPI noise problem in the optical fiber system can be detected.

It should be noted that the processor (for example, the processor 1010 in FIG. 10) in the embodiments of this application may be an integrated circuit chip with a signal processing capability. In an implementation process, the steps in the foregoing method embodiments can be implemented using a hardware integrated logical circuit in the processor, or using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It can be understood that the memory (for example, the memory 1030 in FIG. 10) in the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

Figure 11:
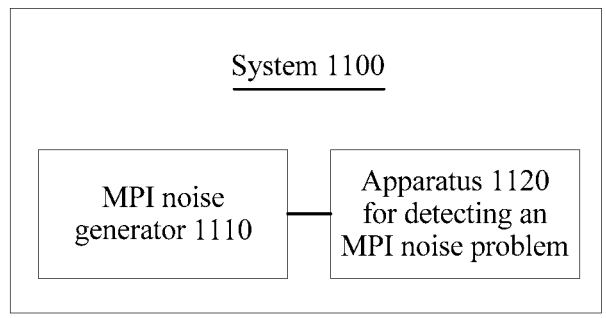
FIG. 11 is a schematic block diagram of a system for detecting an MPI noise problem according to a third embodiment of the present disclosure.

FIG. 11 shows a system for detecting an MPI noise problem according to an embodiment of the present disclosure. The system 1100 may include an MPI noise generator 1110 and an apparatus 1120 for detecting MPI noise problems.

The MPI noise generator 1110 may be any MPI noise generator in FIG. 4 to FIG. 8, and the apparatus 1120 for detecting an MPI noise problem may be the apparatus for detecting an MPI noise problem in FIG. 9 or FIG. 10.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" appearing throughout the specification does not refer to a same embodiment. In addition, these particular features, structures, or characteristics may be combined in one or more embodiments using any appropriate manner. It should be understood that sequence numbers of the foregoing processes do not mean execution sequences in the embodiments of this application. The execution sequences of the processes should be determined based on functions and internal logic of the processes, and shall not constitute any limitation on the implementation processes of the embodiments of this application.

In addition, terms "system" and "network" may be used interchangeably in this specification. The term "and/or" in this specification describes only an association relationship for describing associated objects and represents that three relationships may exist. For example, "A and/or B" may represent the following three cases: only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only, that is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of the examples according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: the computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber cable, a twisted pair, a digital subscriber line (DSL) or wireless technologies such as infrared ray, radio and microwave, the coaxial cable, optical fiber cable, twisted pair, DSL or wireless technologies such as infrared ray, radio and microwave are included in fixation of a medium to which they belong. A disk (Disk) and disc (disc) used in this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A method for detecting a multi-path interference (MPI) noise problem, wherein the method comprises:
receiving a first signal, wherein the first signal comprises a service signal sent by a sending device and an MPI noise signal generated by an MPI noise generator, and the MPI noise generator is disposed between the sending device and a receiving device;
adjusting an intensity of the MPI noise signal by an adjuster in the MPI noise generator;
determining whether a packet loss occurs in the service signal; and
determining that there is an MPI noise problem in an optical fiber link between the sending device and the receiving device when a packet loss occurs in the service signal.

2. The method of claim 1, wherein the method further comprises:
triggering indication information to be sent, wherein the indication information is used to instruct a user to maintain an optical fiber connector in the optical fiber link.

3. The method of claim 1, wherein
the sending device and the receiving device are in a normal operating state.

4. The method of claim 1, wherein the method further comprises:
determining that there is no MPI noise problem in the optical fiber link between the sending device and the receiving device when no packet loss occurs in the service signal.

5. An apparatus for detecting a multi-path interference MPI noise problem, wherein the apparatus comprises:

a transceiver, configured to receive a first signal, wherein the first signal comprises a service signal sent by a sending device and an MPI noise signal generated by an MPI noise source;

the MPI noise source configured to generate the MPI noise signal and adjust an intensity of the MPI noise signal, wherein the MPI noise source is disposed between the sending device and a receiving device, and the the transceiver is located in the receiving device; and a processor, configured to: determine whether a packet loss occurs in the service signal, and determine that there is an MPI noise problem in an optical fiber link between the sending device and the receiving device when a packet loss occurs in the service signal.

6. The apparatus of claim 5, wherein the processor is further configured to trigger indication information to be sent, wherein the indication information is used to instruct a user to maintain an optical fiber connector in the optical fiber link.

7. The apparatus of claim 5, wherein the sending device and the receiving device are in a normal operating state.

8. The apparatus of claim 5, wherein the processing unit is further configured to:

determine that there is no MPI noise problem in the optical fiber link between the sending device and the receiving device when no packet loss occurs in the service signal.

9. A multi-path interference MPI noise generator, comprising:

an input end, configured to receive a service signal sent by a sending device;

a processor, configured to generate MPI noise based on the service signal;

an adjuster configured to adjust an intensity of the MPI noise; and an output end configured to send the service signal and the MPI noise to a receiving device.

10. The MPI noise generator of claim 9, wherein the processor comprises:

a coupler, configured to decompose a second signal from the service signal;

a decorrelator, configured to remove coherence between the second signal and the service signal to form the MPI noise; and a combiner, configured to couple the MPI noise to the service signal to form a first signal.

11. The MPI noise generator of claim 10, wherein components in the MPI noise generator are connected through a polarization maintaining optical fiber; and the processor comprises:

a polarizer configured to adjust a polarization state of the service signal to be the same as a polarization state of the MPI noise.

12. The MPI noise generator of claim 11, wherein the polarizer further comprises:

a first polarizer configured to adjust the polarization state of the service signal to a first polarization state; and a second polarizer configured to adjust the polarization state of the MPI noise to the first polarization state.

13. The MPI noise generator of claim 9, wherein the processor comprises:

at least one optical fiber connector configured to generate the MPI noise.

14. The MPI noise generator of claim 13, wherein the at least one optical fiber connector is connected through a polarization maintaining optical fiber; and the processor further comprises:

a polarizer, configured to adjust a polarization state of the service signal to be the same as a polarization state of the MPI noise.

\* \* \* \* \*

UNITED STATES PATENT AND TRADEMARK OFFICE
CERTIFICATE OF CORRECTION

PATENT NO. : 10,911,139 B2
APPLICATION NO. : 16/674177
DATED : February 2, 2021
INVENTOR(S) : Xi Huang and Guodao Chen Page 1 of 1

It is certified that error appears in the above-identified patent and that said Letters Patent is hereby corrected as shown below:

In the Claims

Column 19, Line 9, Claim 5: delete "the the" and insert --the-- therefore

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*